No. 813,943. PATENTED FEB. 27, 1906.
J. A. BOLDEN.
MACHINE FOR CUTTING SUGAR CANE.
APPLICATION FILED JULY 21, 1905.
2 SHEETS—SHEET 1.
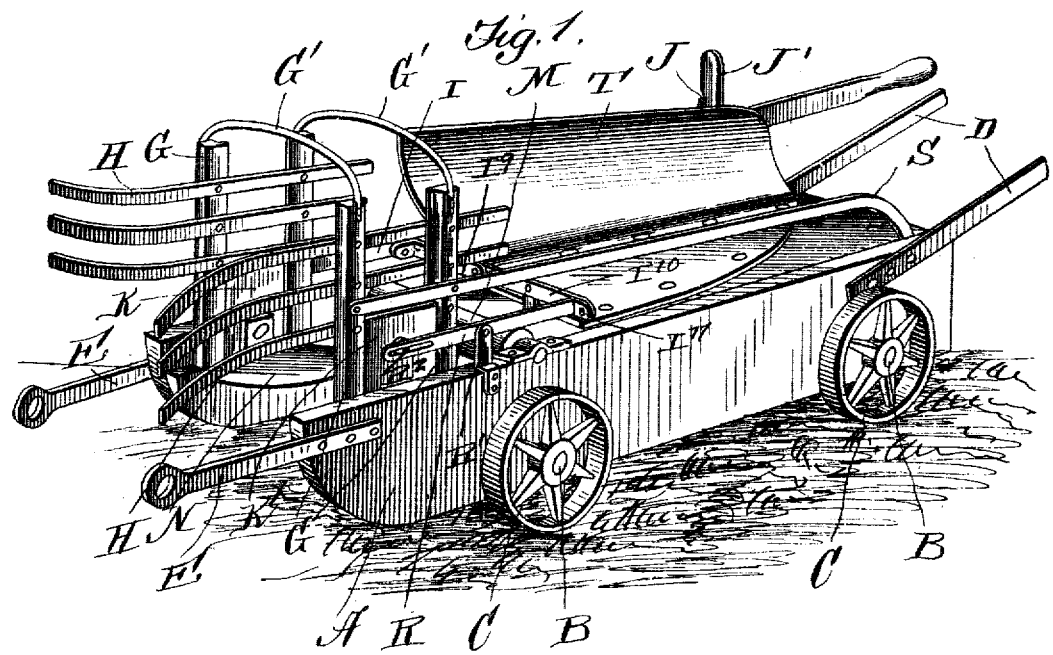
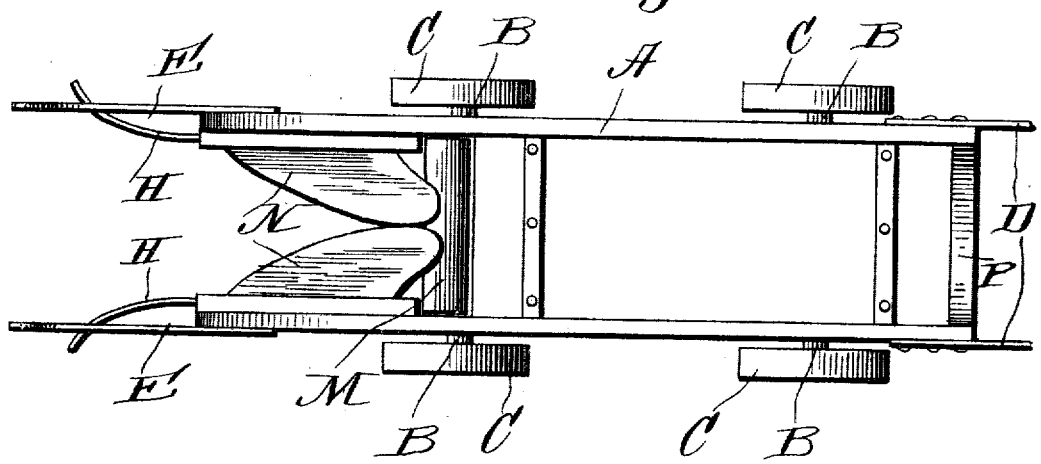
Witnesses
R. A. Boswell
A. L. Hough
Inventor
James A. Bolden
By Franklin H. Hough
Attorney No. 813,943. PATENTED FEB. 27, 1906.
J. A. BOLDEN.
MACHINE FOR CUTTING SUGAR CANE.
APPLICATION FILED JULY 21, 1905.
2 SHEETS—SHEET 2.
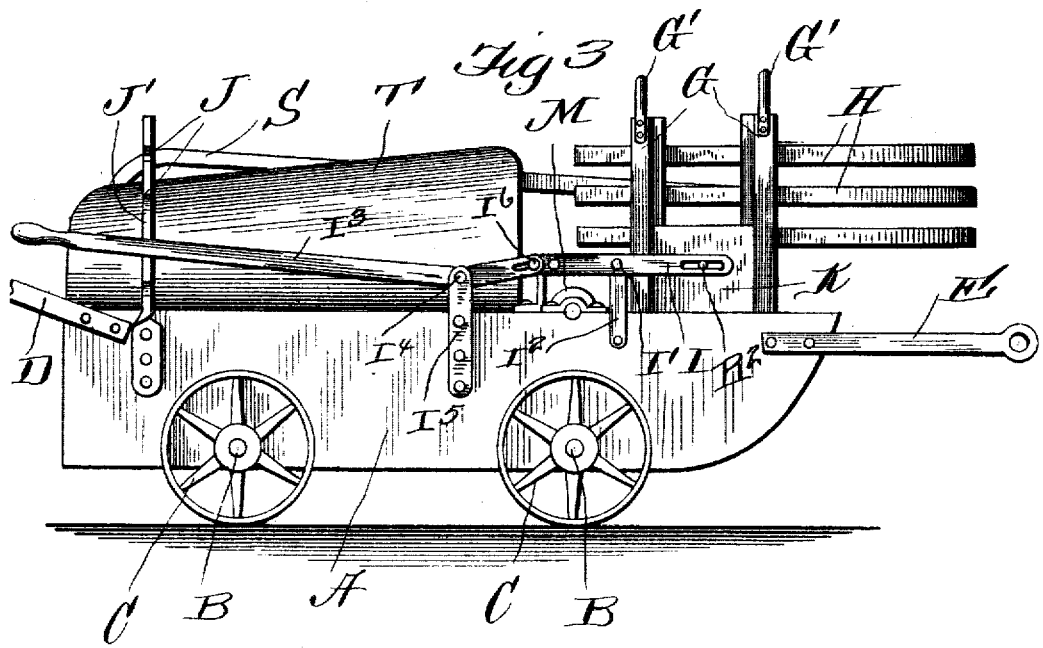
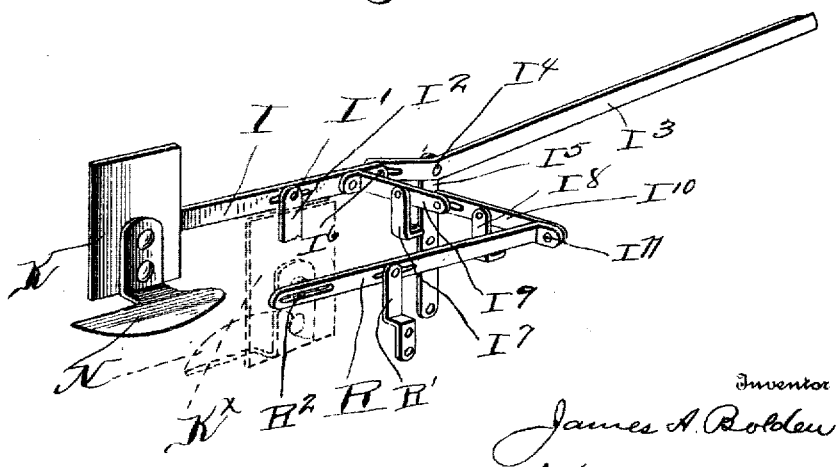

UNITED STATES PATENT OFFICE.

JAMES ANDREW BOLDEN, OF GRAY, LOUISIANA.

MACHINE FOR CUTTING SUGAR-CANE.

No. 813,943.　　　Specification of Letters Patent.　　　Patented Feb. 27, 1906.

Application filed July 21, 1905. Serial No. 270,702.

*To all whom it may concern:*

Be it known that I, JAMES ANDREW BOLDEN, a citizen of the United States, residing at Gray, in the parish of Terre Bonne and State of Louisiana, have invented certain new and useful Improvements in Machines for Cutting Sugar-Cane; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for cutting sugar-cane, and comprises a suitable frame which is hollow upon its under side, mounted upon wheels and adapted to be driven over a row of sugar-cane, and adjustable knives which are disposed opposite each other within the hollow portion of the frame and adapted to be adjusted to cut the stalks at different heights, and also means for centering the stalks over the knives as the apparatus is moved forward.

My invention comprises various other details of construction and combinations and arrangements of parts, which will be hereinafter fully set forth and then specifically defined in the appended claim.

My invention is illustrated in the accompanying drawings, which, with the letters of reference marked thereon, form a part of this application, and in which drawings—

Figure 1 is a perspective view of my improved apparatus for cutting sugar-cane. Fig. 2 is a bottom plan view. Fig. 3 is a side elevation, and Fig. 4 is a perspective view showing the lever-and-bar connections for raising and lowering the cutting-knives.

Reference now being had to the details of the drawings by letter, A designates the frame of the apparatus, which is preferably hollow to allow sufficient space for the knives and the means for adjusting the same and also to allow the stalks of cane to pass readily to the cutting-knives. Suitable axles B are secured to the opposite sides of the frame and have journaled thereon the wheels C. Suitable handles D are secured to the rear end of the frame, and fastened to the forward ends of the frame are the bars E, to which whiffletrees may be attached, whereby the device may be drawn by animals. Upon the inner faces of the sides of the frame are fastened the vertical posts G, which are connected together at their upper ends by the curved rods G', and fastened parallel to one another upon said posts are the guide-strips H, the free ends of which are slightly outwardly curved and afford means for straightening up the stalks of cane and holding them erect while they are passing the cutting-knives, presently to be described.

Mounted in suitable guideways along the sides of the frame are the sliding plates K and $K^\times$, the lower ends of which have bolted or otherwise secured thereto the cutting-knives N, which are horizontally disposed, with their cutting edges curved and approaching each other near their rear ends, thereby affording draw-cutting edges against the stalks of cane as the apparatus moves forward.

Journaled in suitable bearings in the upper edges of the sides of the frame and adjacent to the rear cutting edges of said knives is a roller M, designed to assist the stalks in falling rearward upon the platform of the apparatus after the stalks have been severed. One of said plates K has a lever I secured thereto, and said lever is fulcrumed at I' upon a bar $I^2$, which is fastened to the side of the apparatus. A lever $I^3$ is pivotally connected at $I^4$ upon a bar $I^5$, which is fastened to the side of the frame, and the inner ends of said levers I and $I^3$ are pivotally connected together at $I^6$. Bracket-arms $I^7$ and $I^8$ are fastened to the frame of the apparatus, and upon said arm $I^7$ the bar $I^9$ is pivotally mounted, one end of the latter being fastened to the lever I and its other end fastened to a bar $I^{10}$, which is pivoted to said arm $I^8$, and said bar $I^{10}$ is also secured at $I^{11}$ to the tilting lever R, which is pivotally mounted upon a bar R', fastened to the side of the frame. The bar $I^{10}$, to which the bar R' is fastened, is supported by the bracket-arm $I^8$, which is secured to the frame of the apparatus. The lever R has an elongated slot in which a pin $R^2$ has a sliding pivotal movement, which pin is fastened to the plate $K^\times$, as shown in Fig. 4. From the foregoing it will be noted that by the operation of the lever $I^3$ and the connected mechanism both plates K and $K^\times$ may be actuated simultaneously. The free end of the lever $I^3$ is adjustably held in the notches J, formed in the edge of the post J', which latter is fastened to the frame, as shown in Fig. 3.

Mounted upon the platform of the apparatus is a concaved shield T, which serves to throw the stalks to one side of the platform as they fall backward, and a rod S is fastened to one of the upright posts upon the frame and extends rearward and has its other end fastened to the platform at any suitable location and is provided to guide the stalks as they move from the shield so that they will fall along the side of the apparatus in a row.

The rear end of the apparatus is cut away, as at P, so that the frame will not interfere with the stubbles as the apparatus moves forward.

From the foregoing it will be observed that by the provision of an apparatus as shown and described a simple and efficient means is afforded which may be drawn over rows of cane and causing the stalks to be cut by the same coming into contact with the inclined or curved edges of the cutting-knives by means of a draw cut, the stalks falling back upon the shield and being deposited along the side of the apparatus as it is drawn back and forth across the cane-field, thus enabling the operator to cut cane over a much larger area than with a hand operating-tool.

Having thus fully described my invention, what I claim as new, and desire to secure by Letters Patent, is—

An apparatus for cutting cane, comprising a truck, an arm projecting from said truck, vertically-adjustable plates mounted in suitable guideways, knives fastened to said plates and disposed in horizontal planes with inclined cutting edges extending toward each other, a lever secured to one of said plates and fulcrumed over said projecting arm, means for holding the free end of said lever in different positions, and a bar secured to one end of the other of said plates and fastened to said lever, whereby as the lever is tilted, said plates may be raised or lowered, as set forth.

In testimony whereof I hereunto affix my signature in the presence of two witnesses.

JAMES ANDREW BOLDEN.

Witnesses:
 GOT BERGER,
 PETER BERGER.